United States Patent
Brooks

(10) Patent No.: US 6,939,022 B2
(45) Date of Patent: Sep. 6, 2005

(54) ILLUMINATION MEANS FOR A CHAINSAW

(76) Inventor: Timothy Reed Brooks, 16891 Hwy 106, Eastanollee, GA (US) 30538

( * ) Notice: Subject to any disclaimer, the term of this patent is extended or adjusted under 35 U.S.C. 154(b) by 86 days.

(21) Appl. No.: 10/625,400

(22) Filed: Jul. 23, 2003

(65) Prior Publication Data

US 2004/0125596 A1 Jul. 1, 2004

Related U.S. Application Data

(60) Provisional application No. 60/397,530, filed on Jul. 23, 2002.

(51) Int. Cl.[7] ............................. F21V 33/00; F21V 21/30
(52) U.S. Cl. ........................................ 362/120; 362/427
(58) Field of Search .......................... 362/89, 115, 119, 362/120, 427; 30/383; 123/2; 173/171, 217

(56) References Cited

U.S. PATENT DOCUMENTS

| | | | | |
|---|---|---|---|---|
| 2,525,588 A | * | 10/1950 | Cameron et al. | 362/119 |
| 4,283,757 A | | 8/1981 | Nalbandian et al. | 362/120 |
| 4,302,797 A | | 11/1981 | Cooper | 362/119 |
| 4,753,012 A | * | 6/1988 | Schurr | 30/382 |
| 4,833,782 A | * | 5/1989 | Smith | 30/392 |
| 5,515,249 A | | 5/1996 | Shiao | 362/119 |
| 6,168,287 B1 | * | 1/2001 | Liu | 362/119 |
| 6,186,638 B1 | | 2/2001 | Chang | 362/119 |
| D439,435 S | | 3/2001 | Belden, Jr. et al. | D6/407 |
| 6,203,165 B1 | | 3/2001 | Chen | 362/119 |
| 6,295,738 B1 | * | 10/2001 | Risch | 33/700 |
| D450,557 S | | 11/2001 | McCalla et al. | D8/107 |
| 6,318,874 B1 | * | 11/2001 | Matsunaga | 362/119 |
| D452,129 S | | 12/2001 | McCalla et al. | D8/107 |
| 6,616,295 B2 | * | 9/2003 | Sako et al. | 362/119 |
| 2002/0054491 A1 | * | 5/2002 | Casas | 362/119 |
| 2002/0069542 A1 | * | 6/2002 | Musacchia | 33/286 |

* cited by examiner

*Primary Examiner*—Alan Cariaso
(74) *Attorney, Agent, or Firm*—John D. Gugliotta; Olen L. York, III

(57) ABSTRACT

An illumination means for a chainsaw is a light source generated for providing a focused beam at the bar and chain of a chainsaw. Illumination means is positioned at the front of the housing of a chainsaw. Illumination means may be integrally incorporated therein or placed onto the exterior of the housing, and may also include a pivotal shell for adjusting the projection of the light beam. Illumination means is operatively and electrically coupled to a switch that actuates generation of light.

4 Claims, 2 Drawing Sheets

ILLUMINATION MEANS FOR A CHAINSAW

RELATED APPLICATIONS

The present invention was first described in Disclosure Document Registration 503,651 filed on Jan. 11, 2002 under 35 U.S.C. §122,37 C.F.R. §1.14 and MPEP §1706, and the present application claims the benefit of U.S. Provisional Application Ser. No. 60/397,530, filed on Jul. 23, 2002.

BACKGROUND OF THE INVENTION

1. Field of the Invention

The present invention relates generally to hand tools incorporating an illumination means or device and, more particularly, to a chain saw having integrated task lighting.

2. Description of the Related Art

Chainsaws have been used as wood cutters for decades, including use in trimming trees, cutting down trees and the like. The vast majority of time, chainsaws are operated during the day. However, some chainsaws are operated at night. Most of this operation is under emergency conditions as a result of downed trees and major limbs as a result of a storm. There may be damage to homes, other structures, power lines, blocked roads and the like that must be corrected quickly. Often emergency crews use their vehicle headlights to light the work area, but this method is not always possible or successful and may compromise safety. Other times require a second person to hold a flashlight, but this method is obviously not an efficient use of manpower and results in longer clean up times. Accordingly, there is a need for a means by which chainsaws operated during nighttime hours under emergency situations can be provided with an adequate and safe light source.

A search of the prior art did not disclose any patents that read directly on the claims of the instant invention; however, the following references were considered related.

U.S. Pat. No. 4,283,757, issued in the name of Nalbandian et al., discloses an illuminated screw driver or hand tool with at least one light bulb for focus toward an intended work area;

U.S. Pat. No. 4,302,797, issued in the name of Cooper, discloses a hand tool with its own source of illumination;

U.S. Pat. No. 5,515,249, issued in the name of Shiao, discloses a hand tool set for holding tools and attachment bits, wherein the tool includes a lamp assembly for illumination;

U.S. Pat. No. 6,186,638, issued in the name of Chang, discloses a hand tool having a pivotally adjusted flashlight disposed at one end;

U.S. Pat. No. 6,203,165, issued in the name of Chen, discloses a tool combination with an illumination device;

U.S. Pat. No. D 450,557, issued in the name of McCalla et al., discloses an ornamental design for a lighted knife handle; and U.S. Pat. No. D 452,129, issued in the name of McCalla et al., discloses an ornamental design for a lighted knife handle.

Consequently, there exists a continuous need for new ideas and enhancements for existing products in the tool illumination industry.

SUMMARY OF THE INVENTION

It is therefore an object of the present invention to provide a chainsaw with illumination means for providing light during operation when lighting is poor.

It is a feature of the present invention to provide an illumination means for a chainsaw that focuses a generated beam of light onto the bar and chain of a chainsaw, thereby increasing the safety of use in poor lighting.

It is a further feature of the present invention to provide an illumination means for a chainsaw that is integrally incorporated into the front of the housing and actuated by a switch operatively and electrically connected therebetween.

It is yet a further feature of the present invention to provide an illumination means for a chainsaw that is positioned at the front of the housing within a pivotal shell, the shell pivotal for providing adjustment and versatility to illumination means and allowing illumination means to operate independently as a light source along a darkened path.

Briefly described according to one embodiment of the present invention, an illumination means for a chainsaw is a light source generated for providing a focused beam at the bar and chain of a chainsaw. Illumination means is positioned at the front of the housing of a chainsaw. Illumination means may be integrally incorporated therein or placed onto the exterior of the housing, and may also include a pivotal shell for adjusting the projection of the light beam. Illumination means is operatively and electrically coupled to a switch that actuates generation of light.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
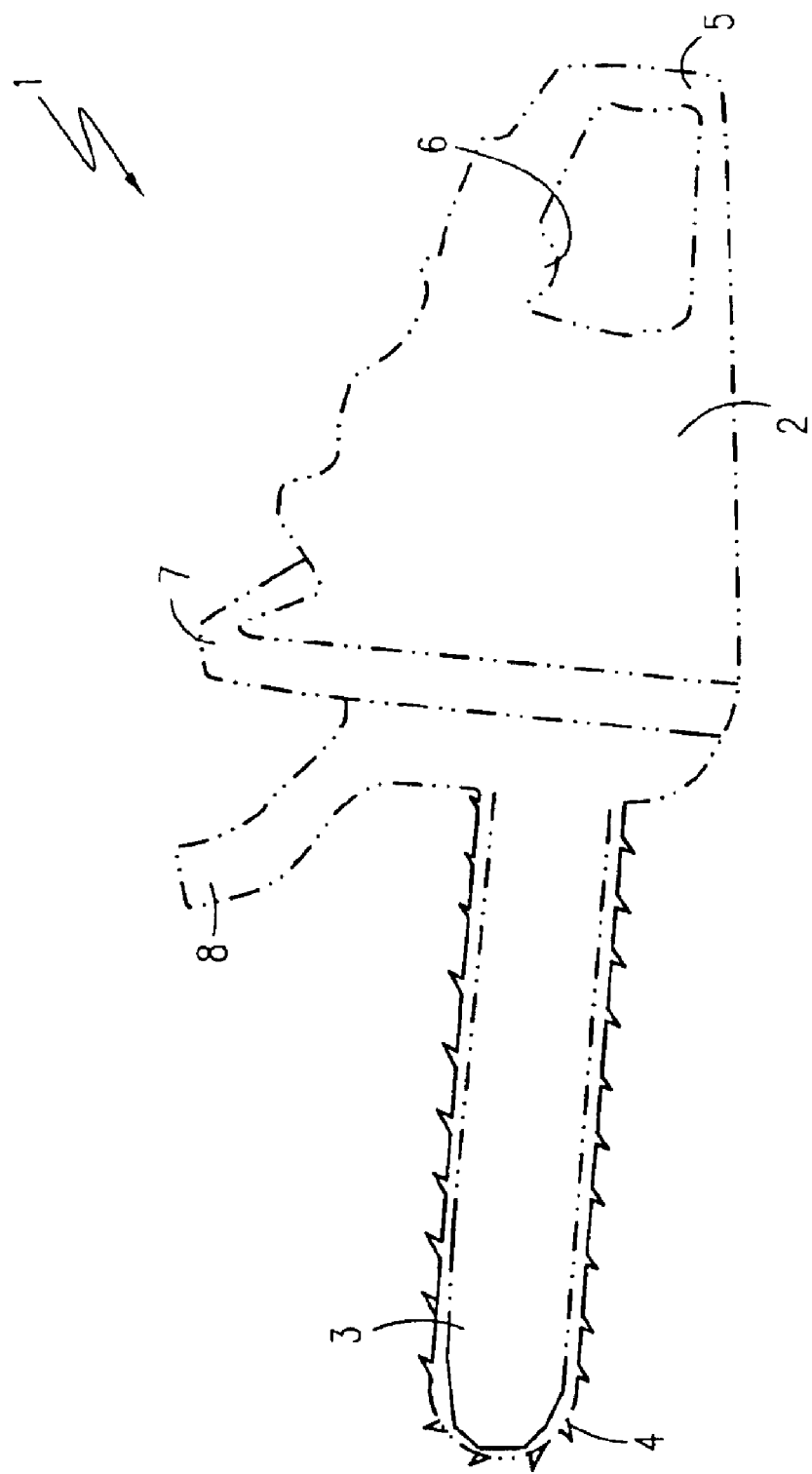
FIG. 1 is a side view of a commercially available chainsaw 1, constituting what is perceived to be PRIOR ART.
Figure 2:
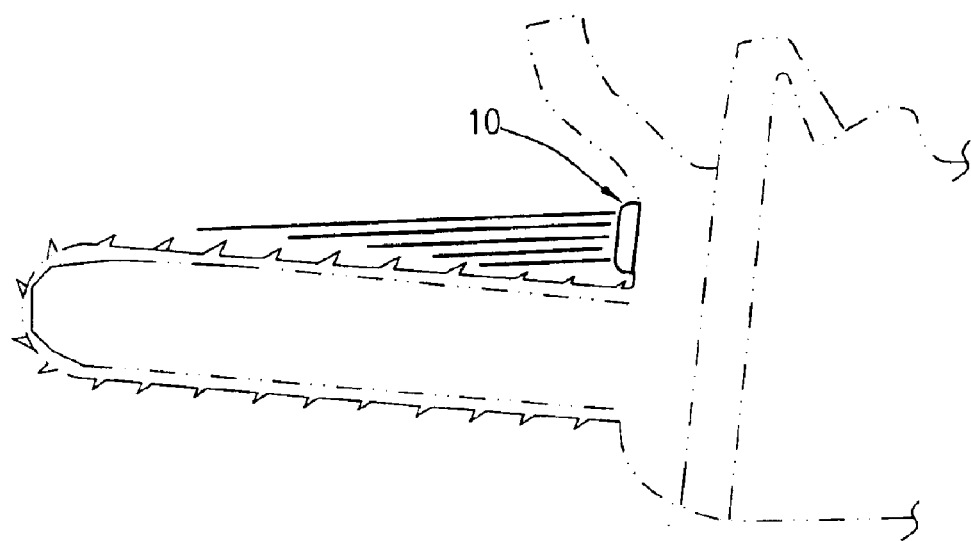
FIG. 2 is a side view of FIG. 1 with illumination means 10 placed at the front of housing 2.
Figure 3:
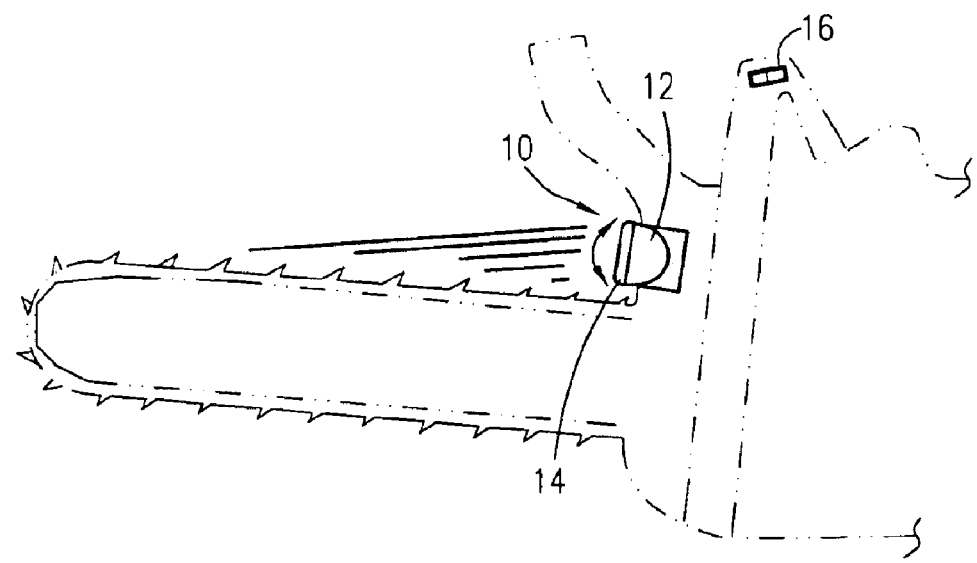
FIG. 3 is a side view of an alternate embodiment of illumination means 10 placed within a pivotal shell 12 and having a rotatable rim 14, and a switch 16.

The best mode for carrying out the invention is presented in terms of its preferred embodiment, herein depicted within FIGS. 1 through 3.

1. Detailed Description of the Figures

Referring now to FIG. 1, the prior art is depicted as a commercially available chainsaw 1 comprising an engine housing 2 with a bar 3 and cutting chain 4 outwardly projected therefrom. The housing 2 is generally manufactured from a durable plastic hardened shell intended to withstand repeated usage and physical abuse associated with wood cutting. The housing 2 includes a rear handle 5 for placement of a user's hand to engage the throttle trigger 6. Opposite to the rear handle 5 is a front handle 7 that traverses the lateral sides of the housing 2 and provides for placement of a user's second hand for use in steadying and controlling the chainsaw 1 during operation. Finally, a front hand guard 8 is placed at the anterior end of the housing 2, between the front handle 7 and the bar 3 and cutting chain 4. The front hand guard 8 operates to protect the user's hand from exposure to the bar 3 and chain 4 during operation, thereby preventing or reducing the incidents of dismemberment or severing of digits or limbs.

Referring now to FIG. 2 and FIG. 3, illumination means 10 incorporated for use with a chainsaw 1 is shown in a preferred embodiment of the present invention. Illumination means 10 is envisioned as being available in an after-market add-on component or as integrated into the chainsaw 1 during manufacture. Illumination means 10 may be manufactured from a variety of materials, including halogen bulbs, quartz halogen bulbs, halogen/xenon bulbs, and other similarly fabricated bulbs known in the art. It is intended that illumination means 10 is manufactured from materials that are suitable for sustaining focused beams of light for several hours without fail.

In one embodiment of the present invention, illumination means 10 is positioned at the front of the housing 2 adjacent to the front handle 7 and front handle guard 8 so that a focused beam of light is generated and projected at the bar 3 and chain 4 during operation. It is envisioned that illumination means 10 may have a variety of geometric configurations, including orthogonal, circular or oval, and regardless of geometric configuration, illumination means 10 is positioned so that approximately one-half of the generated light is projected to one lateral side of the bar 3 and chain 4 and one-half of the generated light is projected to the opposite lateral side of the bar 3 and chain 4, providing a more evenly distributed beam of light for operation.

In another embodiment of the present invention, as depicted in FIG. 3, illumination means 10 is housed in a pivotal shell 12. The shell 12 is positioned to the exterior of the housing 2, projecting either from the front of the housing 2 or from the top of the housing 2 near the front hand guard 8. The shell 12 is pivotal so as to provide the user the ability to adjust the shell 12 and illumination means 10 if dictated by circumstance. The shell 12 is pivotal laterally and longitudinally. It is further envisioned that the pivotal feature of the shell 12 also allows the user to adjust the shell 12 to operate as a flashlight along a darkened path in between usage of the chainsaw 1 for cutting. For example, if a user must negotiate a darkened path in a wooded or covered area, the user would be able to actuate illumination means 10, adjust the shell 12 and illuminate the desired pathway, if only for a brief time until reaching the area in which work is to be performed. It is further envisioned that the shell 12 may be provided with an annular rim 14 rotatable for adjusting the intensity of the light beam generated by illumination means 10, which may be especially advantageous if many hours of work are required but illumination means 10 has a life of less than the estimated hours, wherein the user could reduce the intensity in more well lighted areas and conserve and preserve the life of illumination means 10.

Illumination means 10 may be powered by a battery source integrally incorporated into the chainsaw 1. Illumination means 10 may also be powered from a battery source external to the chainsaw 1, such as a battery source clipped to the belt of a user and with electrical connection provided therebetween. Illumination means 10 may also be powered by a generator that relays electrical energy from the power and energy generated by the motor of the chainsaw 1.

Illumination means 10 is actuated by a switch 16, which may be a sliding switch, a push-button switch, a toggle switch, or other similar suitable switch mechanisms. Illumination means 10 and switch 16 are operatively and electrically coupled so that placement of switch 16 into an "on" position actuates generation of light from illumination means 10, and placement of switch 16 into an "off" position terminates generation of light from illumination means 10. Switch 16 may be placed in a variety of suitable positions along the chainsaw 1, provided that the switch 16 does not unnecessarily endanger the user either before, during or after operation of the chainsaw 1. In one embodiment, the switch 16 is placed on the front handle 7 so as to provide easy access to the user, but at a position that avoids accidental disengagement of illumination means 10. Other appropriate and envisioned locations for placement of switch 16 are along the lateral sides of housing 2 and/or near the rear handle 5.

2. Operation of the Preferred Embodiment

To use the present invention, in accordance with a preferred embodiment of the present invention, a user will slide or place switch 16 into the "on" position, thereby generating light from illumination means 10. The user will then operate the chainsaw 1 in the usual, and safe, manner, with the generated light from illumination means 10 focused on the bar 3 and chain 4, thereby illuminating the area of work for the user in poorly lighted areas, including nighttime and/or during power outages and storms.

The foregoing descriptions of specific embodiments of the present invention have been presented for purposes of illustration and description and are hot intended to be exhaustive or to limit the invention to the precise forms disclosed. Many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. In a chainsaw with an engine an engine housing and a bar and chain cutting area outwardly projected therefore, wherein the improvement comprises:

illumination means mounted on a front of said engine housing and aimed at said bar and chain cutting area; and a switch operatively coupled with a power source and said illumination means, said switch actuating illumination of said illumination means in an on position, and said switch terminating illumination of said illumination in an off position, wherein said switch is positioned on a front handle of said chainsaw.

2. The improvement of claim 1, wherein said illumination means is integrally mounted at said front of said engine housing.

3. The improvement of claim 1, wherein said illumination means is externally mounted at said front of said engine housing.

4. The improvement of claim 3, wherein said illumination means is housed in a pivotal shell, said shell being pivotal laterally and longitudinally for positional adjustment of said illumination means.

* * * * *